(12) United States Patent
Gottinger et al.

(10) Patent No.: US 9,924,847 B2
(45) Date of Patent: Mar. 27, 2018

(54) SELF-PROPELLED WORKING DEVICE

(71) Applicant: VIKING GmbH, Langkampfen (AT)

(72) Inventors: Clemens Gottinger, Kufstein (AT); Gerhard Auer, Lofer (AT)

(73) Assignee: Viking GmbH, Langkampfen (AT)

( * ) Notice: Subject to any disclaimer, the term of this patent is extended or adjusted under 35 U.S.C. 154(b) by 190 days.

(21) Appl. No.: 14/859,317

(22) Filed: Sep. 20, 2015

(65) Prior Publication Data
US 2016/0081526 A1 Mar. 24, 2016

(30) Foreign Application Priority Data
Sep. 20, 2014 (EP) ..................................... 14003266

(51) Int. Cl.
*A47L 11/40* (2006.01)
*A47L 9/00* (2006.01)
*A01D 34/00* (2006.01)

(52) U.S. Cl.
CPC ............ *A47L 11/4066* (2013.01); *A47L 9/00* (2013.01); *A47L 11/4008* (2013.01); *A47L 11/4069* (2013.01); *A01D 34/008* (2013.01); *A47L 2201/00* (2013.01)

(58) Field of Classification Search
CPC .... A47L 11/4066; A47L 9/00; A47L 11/4008; A47L 11/4069; A47L 2201/00; A47L 9/2842; A47L 9/2857; A01D 34/008
See application file for complete search history.

(56) References Cited

U.S. PATENT DOCUMENTS

| 2,953,798 | A | * | 9/1960 | Borie, Jr. | .............. A47L 11/292 15/99 |
| 8,510,903 | B2 | * | 8/2013 | Jubner | ...................... A47L 9/00 15/323 |
| 2004/0163205 | A1 | * | 8/2004 | Albert | ................... A47L 9/1427 15/352 |
| 2007/0234505 | A1 | * | 10/2007 | Gordon | ..................... A47L 5/34 15/354 |
| 2012/0180253 | A1 | * | 7/2012 | Hwang | .................. A47L 9/108 15/339 |
| 2012/0210536 | A1 | * | 8/2012 | Jan | ........................... B60S 1/64 15/313 |
| 2014/0259464 | A1 | * | 9/2014 | Renaud | ................... B60B 37/10 15/1.7 |

FOREIGN PATENT DOCUMENTS

| EP | 2 412 219 A1 | 2/2012 |
| EP | 2 417 894 A1 | 2/2012 |
| WO | 2013/125991 A1 | 8/2013 |

* cited by examiner

Primary Examiner — Robert Scruggs
(74) Attorney, Agent, or Firm — Gudrun E. Huckett

(57) ABSTRACT

A self-propelled working device is provided with a housing and a pivot bearing arranged on the housing. At least one operating element is arranged on the housing. At least one lid is pivotably supported on the housing and is provided with a bearing section interacting with the pivot bearing. The at least one lid has a closed position and covers in the closed position the operating element. The lid has a first part and a second part connected to the first part. The bearing section is formed on the first part of the lid. The second part of the lid covers the operating element. When a constructively predetermined pulling force is applied to the second part, the second part detaches from the first part.

17 Claims, 5 Drawing Sheets

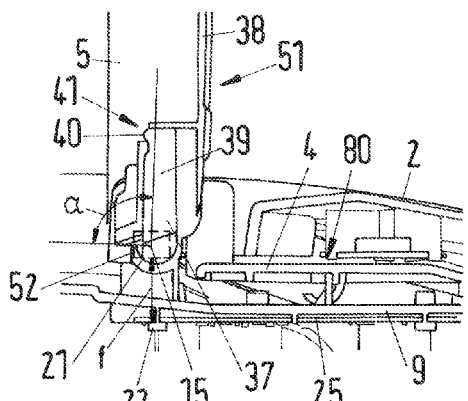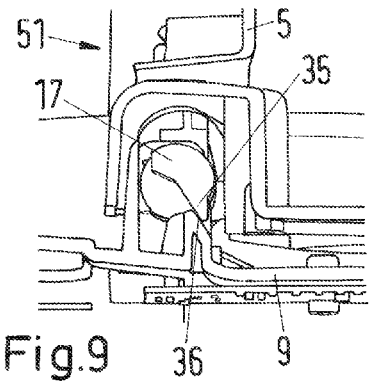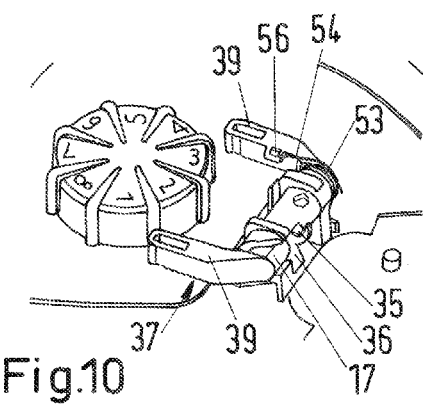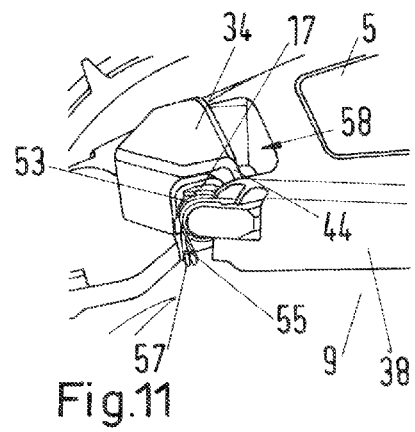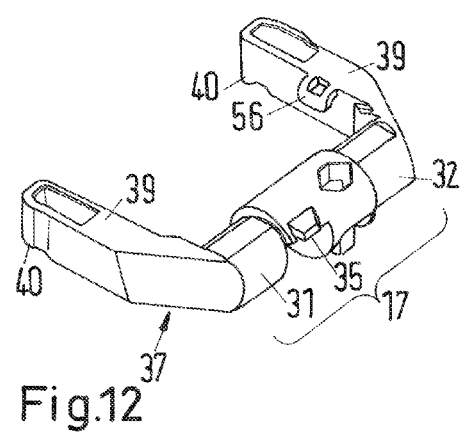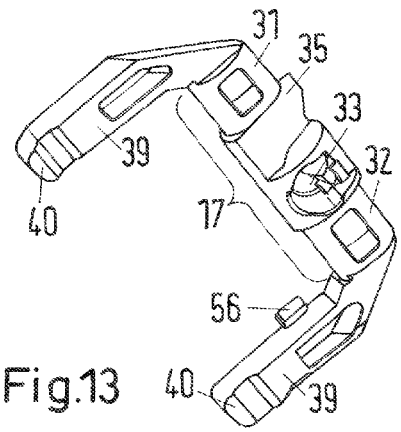

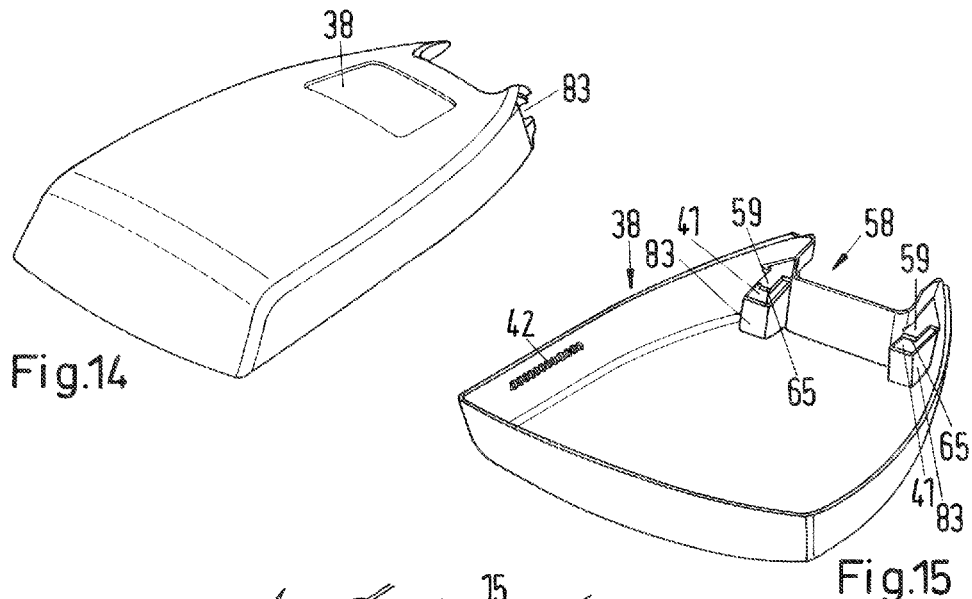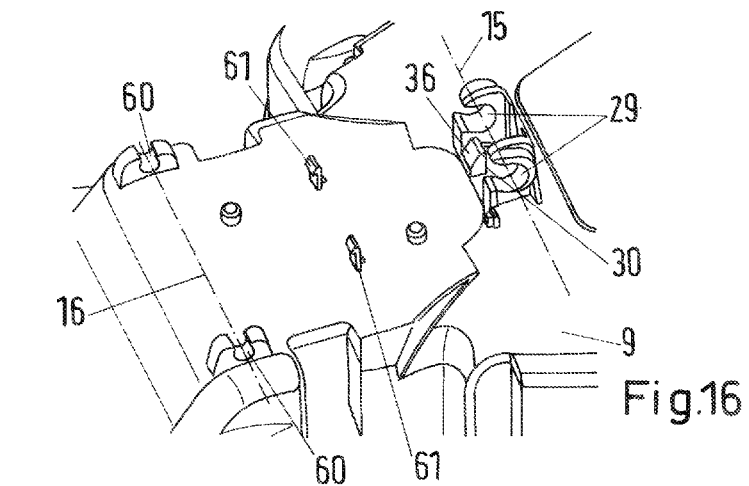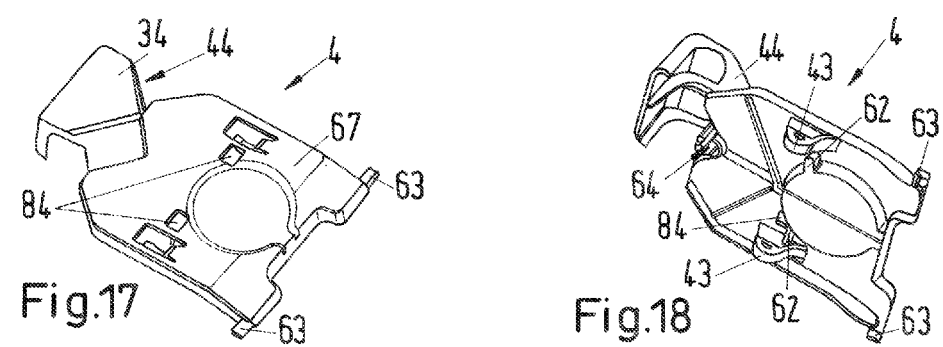

SELF-PROPELLED WORKING DEVICE

BACKGROUND OF THE INVENTION

The invention relates to a self-propelled working device comprising at least one propelling drive and further comprising a housing, wherein on the housing at least one lid is pivotably supported, wherein the lid comprises a bearing section on which at least one pivot bearing for the lid is arranged.

EP 2 417 894 A1 discloses a self-propelled working device, i.e., a vacuum cleaner. The vacuum cleaner comprises a lid that closes off a receiving space for a dirt collecting container. In completely open position, the lid actuates a switch so that it can be detected that the lid is completely open. The lid is fixedly supported on the housing so that the operator can lift the vacuum cleaner by gripping the lid. When the lid is held at a slant angle, the working device can neither detect that the lid is open nor that the operator is lifting the working device.

SUMMARY OF THE INVENTION

It is an object of the present invention to provide a self-propelled working device of the aforementioned kind that prevents lifting of the working device in operation by gripping the lid.

In accordance with the present invention, this is achieved in that the lid in the closed position covers at least one operating element, in that the bearing section is formed on a first part of the lid, and in that the lid comprises a second part that covers the operating element and that, when a constructively predetermined pulling force is surpassed, separates from the first part.

Since the second part of the lid detaches or separates from the first part upon surpassing the constructively predetermined pulling force, the working device can no longer be lifted by gripping the lid. The lid is provided in order to cover at least one operating element of the working device in the closed position of the lid.

Advantageously, the second part is connected to the first part by means of at least one detachable connection. Upon surpassing the constructively predetermined pulling force, the second part detaches from the first part without damaging or destroying one of the two parts. In this way, it is thus avoided that the operator can lift the working device by gripping the lid; the second part detaches from the first part when the operator attempts to lift the working device by gripping the lid but without the parts of the working device becoming damaged or destroyed.

A simple configuration results when the detachable connection is a locking connection that comprises a locking element. The locking element is advantageously provided on an arm of one of the two (first and second) parts and locks on a locking rim of the other one of the two (first and second) parts. The locking rim delimits in particular a locking opening into which the locking element in the locked state projects at least partially. A simple advantageous configuration results when the arm is arranged on the first part and the second part comprises the locking opening. By means of the locking element on the arm and the locking rim, the constructively predetermined pulling force can be adjusted by an appropriate configuration, for example, by adjusting the locking depth and locking ramps. The constructively predetermined pulling force at which the second part detaches from the first part is advantageously smaller than the weight force of the working device. In particular, the predetermined pulling force is smaller than the weight force of the working device without the weight force of the second part. In this way, it is ensured that the working device cannot be lifted by gripping the second part.

The first part is advantageously supported in a springy fashion so as to be loaded in the direction of the open position of the lid. When the second part is detached from the first part, the first part advantageously moves by spring action into its open position. When the lid is not completely closed, the propelling drive and/or a drive device for at least one tool of the working device is advantageously switched off. The second part comprises advantageously at least one locking contour which in the closed position of the lid locks on the housing and secures the lid in the closed position. Since the locking contour is arranged on the second part, locking of the lid when the second part is detached is not possible anymore. The first part is then no longer secured in the closed position and moves as a result of the spring action of the spring in the direction toward the open position of the lid. Advantageously, the working device comprises at least one sensor for detecting at least one pivot position of the first part. By means of the sensor, it is in particular detected when the lid is in its open position or in its closed position. When the operator lifts the working device by gripping the second part, the second part detaches from the first part and the first part is pivoted in the direction of the open position due to the spring action acting on the first part. This open position is detected by the at least one sensor. Accordingly, the working device can detect whether the lid is open or whether the second part has become detached from the first part, for example, when the operator has attempted to lift the working device by gripping the lid. In this case, the propelling drive and/or the drive device for a tool of the part of the working device is advantageously switched off.

In order to achieve simple mounting of the bearing section on the housing, it is advantageously provided that the bearing section is supported in at least one receptacle on the housing, wherein the receptacle has an opening at the circumference by means of which the bearing section can be mounted in the receptacle. The bearing section is advantageously snapped into the receptacle. The opening of the receptacle is in particular arranged on the side of the receptacle that is facing away from the second part of the lid. The receptacle for the bearing of the first part is advantageously stable and designed so strongly that the lid in operation cannot accidentally become detached from the housing. Detachment of the lid is realized by the detachable connection between the second part and the first part. Accordingly, the pulling forces for demounting the bearing section from the housing and for detaching the second part of the lid from the first part can be designed independent of each other. Accordingly, the connection of the second part to the first part can be designed with a comparatively minimal pulling force. The bearing of the bearing section on the housing can be stable and designed such that it can become detached only with a great pulling force. In this way, a high stability of the arrangement is provided. At the same time, lifting of the working device by gripping the lid is prevented in a simple way. The opening is advantageously at least partially covered by a stop switch of the working device. In this way, an additional securing action of the bearing section in the receptacle is achieved. At the same time, the receptacle is protected from becoming soiled.

In order to define the completely open position of the lid, advantageously on the first part a stop is formed which interacts with the housing. Since the stop is provided on the first part, the stop defines also the end position of the first part when the second part has been removed from the first part. Between the completely closed and the completely open position, the lid advantageously performs a travel stroke across a pivot angle of approximately 70° to approximately 110°, in particular of approximately 80° to approximately 100°.

BRIEF DESCRIPTION OF THE DRAWING

FIG. 8 is a section illustration of the bearing area of the lid with the lid in the open position.

FIG. 9 is section view of a stop at the bearing section with the lid in the open position.

FIG. 10 is a perspective illustration of the housing with a first part of the lid arranged thereat.

FIG. 11 is a perspective illustration in the area of the bearing section of the lid.

FIG. 12 is a perspective view of the first part of the lid.

FIG. 13 is another perspective view of the first part of the lid.

FIG. 14 is a perspective view of the second part of the lid.

FIG. 15 is another perspective view of the second part of the lid.

FIG. 16 is a perspective view of the housing in the area of the stop switch.

FIG. 17 is a perspective illustration of the stop switch.

FIG. 18 is another perspective illustration of the stop switch.

DESCRIPTION OF THE PREFERRED EMBODIMENTS

Figure 1:
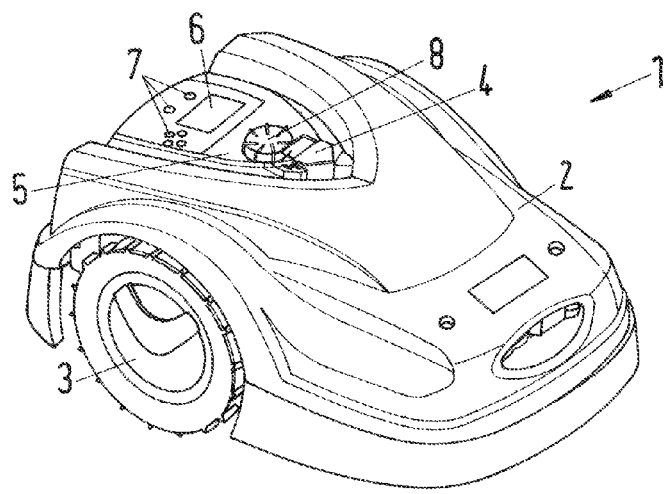
FIG. 1 shows a perspective illustration of a working device.

FIG. 1 shows a self-propelled working device 1 that is designed as a lawnmower. The self-propelled working device 1 can also be a different kind of self-propelled working device, for example, a vacuum cleaner or the like. The working device 1 is designed as an autonomous working device. It moves automatically across the surface to be worked on, for example, a lawn, without an operator having to be present. The working device 1 comprises a cover 2. In the area of a cutout of the cover 2, a stop switch 4 and a lid 5 are arranged. In the embodiment, the lid 5 is transparent. The lid 5 covers a display 6 as well as operating elements 7 arranged adjacent to the display 6. A further operating element 8 serves for adjusting the cutting height and is also arranged underneath the lid 5.

Figure 2:
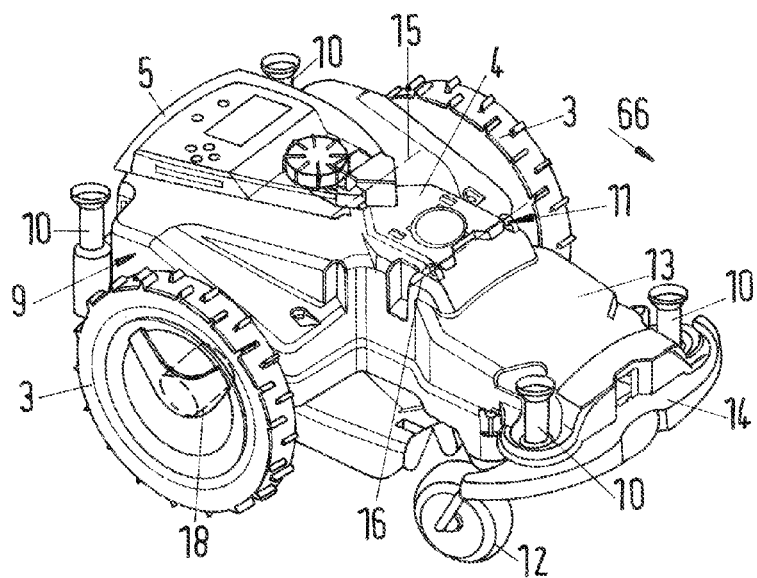
FIG. 2 shows the working device of FIG. 1 with the cover removed.

As shown in FIG. 2, the working device 1 has two wheels 3 that have a relatively large outer diameter and that move the working device 1. The wheels 3 are driven by a propelling drive 18. In the embodiment, each wheel 3 has its own propelling drive 18 that is, for example, an electric motor, optionally with an additional gearbox. The working device 1 comprises also a front wheel 12 of a smaller diameter that is pivotably supported and therefore can align itself in the travel direction. The working device 1 comprises a housing 9 on which the cover 2 is movably supported. In the embodiment, for movable support of the cover 2 four spring elements 10 are provided. The housing 9 comprises a housing top part 13 and a housing bottom part 14 and is substantially of a closed configuration. In this way, soiling of the interior of the housing 9 is substantially prevented. On the side of the housing top part 13 that is facing upwardly in operation, the lid 5 and the stop switch 4 are pivotably supported. The stop switch 4 is pivotably supported by pivot bearing 11 about a pivot axis 16. The lid 5 is pivotably supported about pivot axis 15. As shown in FIG. 2, the pivot axes 15 and 16 are approximately parallel to each other and, in the embodiment, approximately parallel to the axis of rotation of the wheels 3. The pivot axis 16 is positioned in the travel direction 66 of the working device 1 in front of the pivot axis 15. The stop switch 4 engages across the area of the pivot axis 15.

Figure 3:
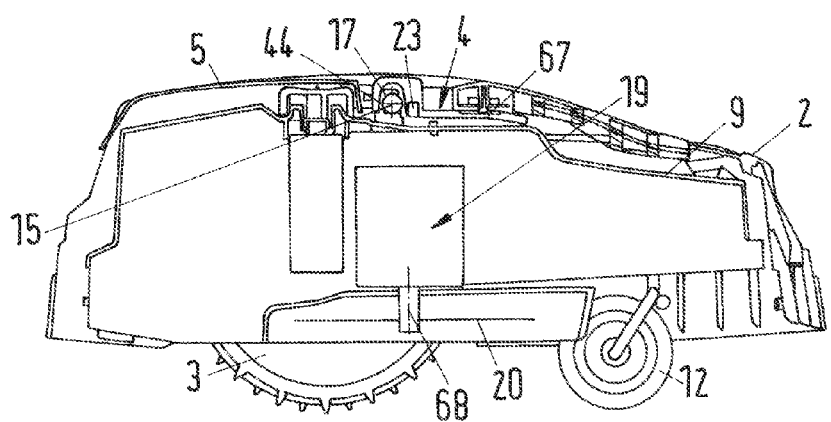
FIG. 3 is a schematic longitudinal section view of the working device of FIG. 1.

As shown in FIG. 3, in the housing 9 a drive device 19 is arranged which advantageously comprises an electric motor and which drives in rotation a tool of the working device 1, in the embodiment a knife 20. The axis of rotation 68 of the knife 20 in operation is approximately perpendicular when the working device 1 is standing on the ground so that the knife 20 moves in an approximately horizontal plane.

As shown in the section illustration of FIG. 3, the lid 5 has a bearing section 17 where the bearing about the pivot axis 15 is formed. The stop switch 4 comprises a section 44 that engages across the bearing section 17. The section 44 in cross-section is approximate U-shaped wherein, in the embodiment, the legs of the U are pointing downwardly when the working device 1 is traveling on the ground. The stop switch 4 comprises a plate-shaped base member 67 that is covered mostly by the cover 2. Approximately in the area in which the section 44 adjoins the base member 67, a magnet 23 is secured on the stop switch 4.

Figure 4:
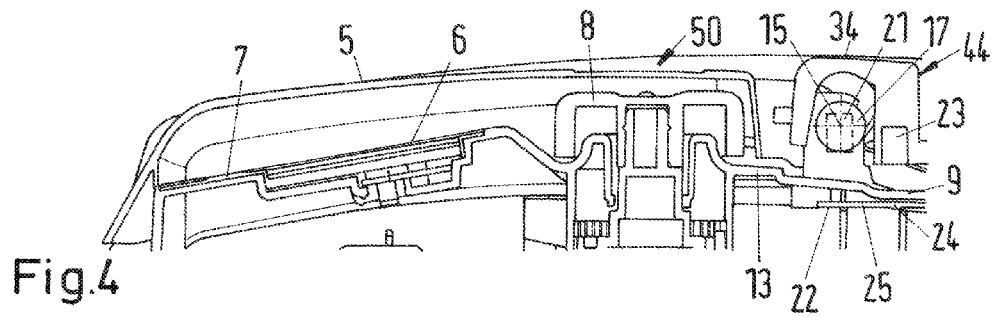
FIG. 4 is a detail view of FIG. 3 in the area of the lid.

As shown in the detail illustration of FIG. 4, in the housing 9 below the housing top part 13 a printed circuit board 25 is arranged that supports the Hall sensors 22 and 24. On the bearing section 17 of the lid 5, a first magnet 21 is arranged that interacts with the first Hall sensor 22, wherein the magnetic field of the first magnet 21 is measured by the first Hall sensor 22. The magnetic field of the second magnet 23 on the stop switch 4 is measured by the second Hall sensor 24. FIG. 4 shows the lid 5 in its closed position 50. In this position 50, the lid 5 covers the display 6, the operating elements 7 for the display 6 as well as the operating element 8 for the height adjustment of the knife 20. As also shown in FIG. 4, on the section 44 of the stop switch 4 an actuating section 34 is formed which can be pushed by the operator. The actuating section 34 is arranged above the bearing section 17 and is not covered by the cover 2.

Figure 5:
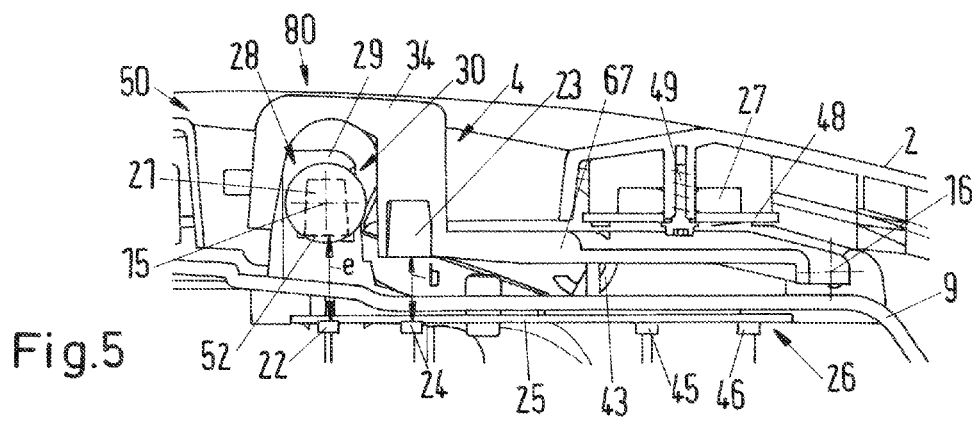
FIG. 5 is a detail view of FIG. 3 in the area of the stop switch.

FIG. 5 shows the area of the stop switch 4 of the working device 1 in detail. The first magnet 21 is arranged in the area of the pivot axis 15. In the embodiment, the pivot axis 15 intercepts the first magnet 21 approximately centrally. As shown in FIG. 5, the first magnet 21 has an end face 52 which in the closed position 50 of the lid 5 is facing the first Hall sensor 22. The end face 52 of the magnet 21 has a spacing e relative to the Hall sensor 22. The second magnet 23 has a spacing b relative to the second Hall sensor 24. In the embodiment, the spacing b is significantly smaller than the spacing e. The spacing b advantageously amounts to less than approximately 80% of the spacing e. The stop switch 4 is provided at its base member 67 with a spring element 43 which is supported on the housing 9 and pretensions the stop switch 4 in the non-actuated position 80, shown in FIGS. 4-6. As also shown in FIG. 5, the lid 5 is supported on a pivot bearing 28 on the housing 9.

Figure 6:
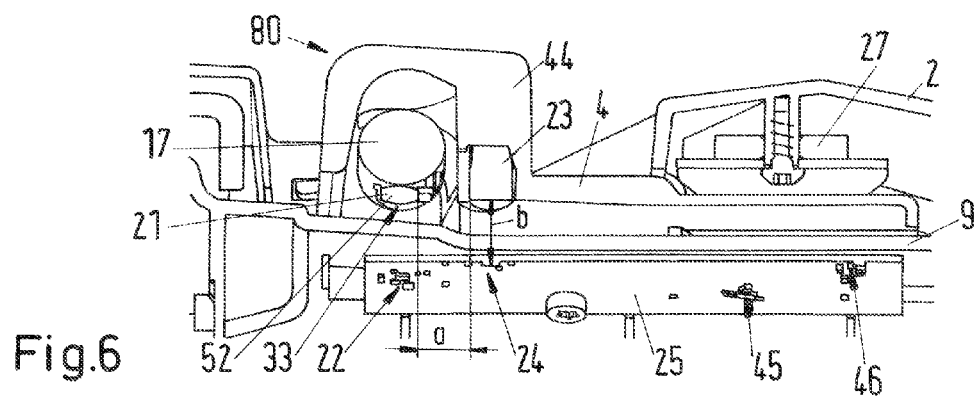
FIG. 6 is a perspective section illustration of the area of the stop switch.
Figure 19:
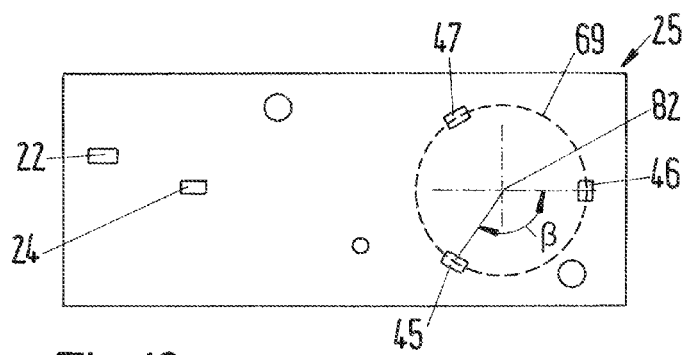
FIG. 19 is a plan view onto the printed circuit board of the working device.

On the cover 2, a third magnet 27 is secured. The third magnet 27 is arranged on the inner side of the cover 2 which is facing the housing 9 and is secured on the cover 2 by means of a washer 48, arranged underneath the third magnet 27, and of a screw 49. The printed circuit board 25 comprises further Hall sensors which are arranged in the area of the magnet 27. In the illustrations of FIGS. 5 and 6, a third Hall sensor 45 and a fourth Hall sensor 46 are visible. As can be seen in the plan view of the printed circuit board 25 in FIG. 19, a fifth Hall sensor 47 is additionally provided. The Hall sensors 45, 46 and 47 are arranged in the embodiment on an imaginary circle 69 and are arranged relative to each other so as to be displaced by an angle β about circular center point 82. In the embodiment, the angle β between two Hall sensors 45, 46 and 47 is 120°, respectively. When the cover 2 is moved parallel to the plane of the printed circuit board 25, the magnetic field of the third magnet 27 which is measured at the Hall sensors 45, 46 and 47 changes. Based on the change of the measured values of the Hall sensors 45, 46, and 47, it can be determined in which direction the cover 2 has been moved relative to the housing 9. Accordingly, the position of an obstacle that the working device 1 has hit can be detected. The Hall sensors 45, 46 and 47 together with the third magnet 27 define a detection device 26 for detection of the position of the cover 2. As is shown in FIGS. 5 and 19, all Hall sensors 22, 24, 45, 46, and 47 are arranged on a common printed circuit board 25.

As shown in FIG. 6, the magnets 21 and 23 have only a minimal spacing a relative to each other. In this context, the magnets 21 and 23 are displaced relative to each other in the longitudinal direction of the pivot axis 15 (FIG. 5). The spacing a is advantageously less than approximately 5 cm, in particular less than approximately 3 cm. Accordingly, the printed circuit board 25 can be designed to be very small and the actuating section 34 of the stop switch 4 where the stop switch 4 upon actuation carries out the greatest pivot travel can be arranged in close proximity of the bearing section 17.

Figure 7:
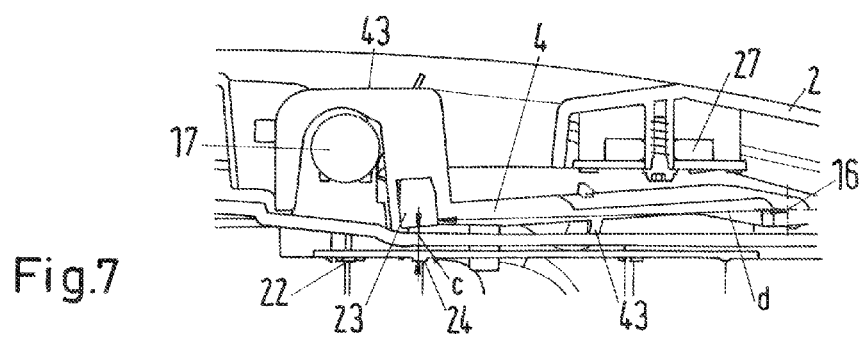
FIG. 7 is a section view in accordance with FIG. 5 for actuated stop switch.

FIG. 7 shows the stop switch 4 in its actuated position 81. The stop switch 4 upon actuation from the non-actuated position 80 into the actuated position 81 was pivoted about pivot axis 16. The second magnet 23 has a relatively large spacing d relative to the pivot axis 16. In the embodiment, the spacing d is greater than 5 cm, in particular greater than 8 cm. Accordingly, the magnet 23 has moved approximately perpendicularly to the printed circuit board 25. Accordingly, the spacing between the magnet 23 and the Hall sensor 24 has been reduced to a spacing c. The magnetic field that is measured by the Hall sensor 24 is therefore greater in the actuated position 81 of the stop switch 4 than in the non-actuated position 80 of the stop switch 4.

FIG. 8 shows the lid 5 in its open position 51 and the stop switch 4 in its non-actuated position 80. Upon pivoting of the lid 5 into the open position 51, the first magnet 21 has been rotated about axis of rotation 15. In the open position 51 which is illustrated in FIG. 8, the first magnet 21 has a spacing f relative to the first Hall sensor 22 which in the embodiment is slightly greater than the spacing e. The spacings e, f can also be approximately identical. As shown in FIG. 8, the lid 5 has been pivoted from the closed position 50 about a pivot angle α into the open position 51. The pivot angle α amounts to approximately 70° to approximately 110°, preferably approximately 80° to approximately 100°. In the embodiment, the pivot angle is approximately 90°. The end face 52 of the first magnet 21 is facing away from the first Hall sensor 22 and is oriented sideward. Accordingly, the magnetic field of the first magnet 21 which is measured by the first Hall sensor 22 is significantly smaller than in the closed position 50 of the lid 5. The change of the magnetic field which results from pivoting of the magnet 21 about the axis of rotation 15 is thus significantly greater than the change of the magnetic field that results from change of the spacing b, c between the second magnet 23 and the second Hall sensor 24. Accordingly, the magnetic field changes can be differentiated well and the magnets 21 and 23 can be arranged at a very small spacing a relative to each other. Accordingly, the correlated Hall sensors 22 and 24 can be arranged at a minimal spacing relative to each other.

As can be seen in FIG. 9, on the bearing section 17 a stop 35 is arranged which projects radially outwardly and interacts with a stop surface 36 of the housing 9 in order to define the completely open position 51 of the lid 5.

The lid 5 is comprised of a first part 37, shown in FIG. 10, and a second part 38, shown in FIGS. 14 and 15. The first part 37 comprises the bearing section 17 as well as two arms 39. The arms 39 serve for connecting the first part 37 to the second part 38. As shown in FIG. 10, on the bearing section 17 a spring 53 is arranged. A first leg 54 of the spring 53 is supported on a support 56 of the first part 37. In the embodiment, the support 56 is formed on an arm 39 of the first part 37. As shown in FIG. 11, the spring 53 comprises a second leg 55 which is supported on a support 57 on the housing 9. The spring 53 acts between the first part 37 and the housing 9 and pretensions the first part 37 in the direction of the completely open position 51 of the lid 5.

FIGS. 12 and 13 show the first part 37 in detail. The bearing section 17 comprises two bearing locations 31 and 32 which are spaced apart from each other. The stop 35 is arranged between the bearing locations 31 and 32. The bearing section 17 extends from the first arm 39 to the second arm 39. The arms 39 project away from the bearing section 17 radially outwardly and are positioned in the same plane. As shown in FIG. 13, between the bearing locations 31 and 32 a recess 33 is provided which serves for receiving the first magnet 21. In FIG. 6, the magnet 21 is shown in the recess 33. The magnet 21 is advantageously snapped into the recess 33.

As also shown in FIGS. 12 and 13, each arm 39 comprises a locking projection 40 at its area facing away from the bearing section 17. The locking projection 40 serves for providing a locking connection of the first part 37 with the second part 38.

As shown in FIG. 14, the second part 38 forms the area of the lid 5 which covers the display 6 and the operating elements 7 and 8. Adjacent to the pivot axis 15 (FIG. 4), the second part 38 comprises two receptacles 83 into which an arm 39 can be inserted, respectively. The receptacles 83 are delimited on the side facing the housing 9 by locking arms 59 which at their free ends support locking rims 65. The locking rims 65 delimit each a locking opening 41 of the receptacles 83. Through the locking openings 41, the locking projection 40 projects, respectively, as shown in FIG. 8. In the area between the receptacles 83, the second part 38 has a cutout 58. In the area of the cutout 58, the bearing section 17 and the section 44 of the stop switch 4 are arranged in the mounted state of the lid 5, as shown in FIG. 11.

The second part 38 comprises at its inner side also a locking contour 42 which serves for locking with the housing 9. In the completely closed position 50 of the lid 5, the locking contour 42 is locked on the housing 9 and secures the lid 5 against the force of the spring 53 (FIGS. 10 and 11) in the closed position 50 (FIG. 2). When the second part 38 is pivoted about the pivot axis 15, the locking contour 42 disengages from the housing 9 and the spring 53 forces the lid 5 into its open position 51 until the stop 35 is resting on the stop surface 36 (FIG. 9). When the working device 1 is lifted by gripping at the second part 38 of the lid 5, the locking connection formed of the locking projection 40 and the locking rim 65 of the opening 41 releases. The locking connection is designed such that it releases when a force is applied that is less than the weight force of the working device 1, in particular less than the weight force of the working device 1 minus the weight of the second part 38 of the lid 5. When the connection between the first part 37 and the second part 38 is canceled, the first part 37 pivots due to the force of the spring 53 into the position which corresponds to the open position 51 of the lid 5. This is detected by the first Hall sensor 22. The drive device 19 and the propelling drives 18 are stopped when the first Hall sensor 22 recognizes that the lid 5 is open or the first part 37 is in a position which corresponds to the open position 51 of the lid 5. The propelling drives 18 and the drive device 19 are also stopped when the second Hall sensor 24 detects that the stop switch 4 is pushed or the Hall sensors 45, 46, and 47 detect a movement of the cover 2 relative to the housing 9. When the cover 2 is pushed downward, the cover 2 will contact the base member 67 of the stop switch 4 (FIG. 5) so that the stop switch 4 is actuated. In this situation, the drive device 19 and the propelling drives 18 are also switched off. It can also be provided to stop only the propelling drives 18 or only the drive device 19 when one of the Hall sensors 22, 24, 45, 46, 47 detects opening of the lid 5, actuation of the stop switch 4, or displacement of the cover 2.

FIG. 16 shows the bearing for the first part 37 of the lid 5 and the stop switch 4 on the housing 9 in detail. The pivot bearing 28 of the lid 5 is formed by receptacles 29 which are integrally formed on the housing 9. The receptacles 29 are open at a side which is facing the pivot axis 16 of the stop switch 4. The openings 30 of the receptacles 29 are facing the base member 67 of the stop switch 4, as shown in FIG. 5. By means of the openings 30, the bearing section 17 with its bearing locations 31 and 32 can be snapped into the receptacles 29. The stop switch 4 engages with its section 44 across the openings 30 and closes them off. In this way, the bearing section 17 cannot accidentally detach from the receptacles 29.

As also shown in FIG. 16, the housing 9 has bearing receptacles 60 which are a component of the pivot bearing 11 (FIG. 2) for the stop switch 4 and in which the stop switch 4 is pivotably supported about the pivot axis 16. In the area between the bearing receptacles 60 and the receptacles 29 for the bearing section 17, holders 61 are integrally formed on the housing 9 and are embodied as locking hooks. As shown in FIGS. 17 and 18, the stop switch 4 has two openings 84 in which one of the holders 16 locks, respectively. The holders 61 secure the stop switch 4 against the force of the spring elements 43 in its non-actuated position 80. Accordingly, the stop switch 4 cannot pivot further upwardly and release the openings 30 of the receptacles 29 (FIG. 16). Adjacent to the openings 84, there are webs 62 provided which extend in the direction of the housing 9 and form stops for the stop switch 4. Adjacent to the openings 84, spring elements 43 of the stop switch 4 are integrally formed. The stop switch 4 comprises at its base member 67 two outwardly projecting bearing sockets 63 which are provided for being supported in the bearing receptacles 60 (FIG. 16). As shown also in FIG. 18, the stop switch 4 comprises at the section 44 a receptacle 64 for the second magnet 23.

Figure 20:
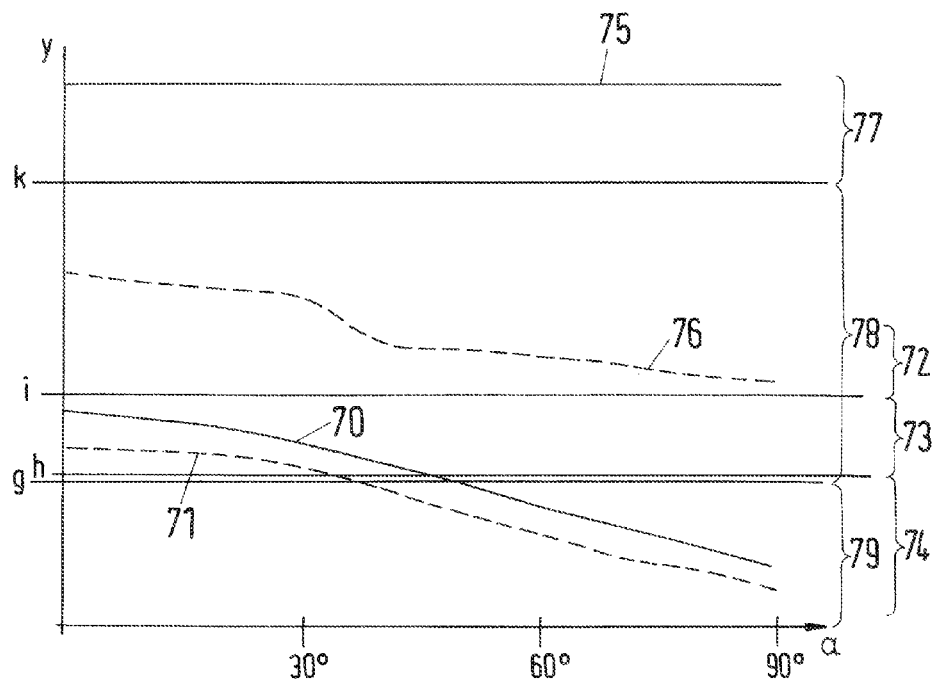
FIG. 20 is a schematic diagram of the measured values of the first and second Hall sensors as a function of the pivot angle of the lid.

FIG. 20 shows schematically the measured values y measured at the Hall sensors 22 and 24 as a function of the pivot angle α of the lid 5. The curve 70 shows the measured values y of the first Hall sensor 22 for the non-actuated position 80 of the stop switch 4, i.e., upon pivoting of the lid 5 from the position illustrated in FIGS. 5 and 6 into the position illustrated in FIGS. 8 and 9. The curve 71 shows the measured values y of the first Hall sensor 22 for actuated position 81 (FIG. 7) of the stop switch 4. As shown in FIG. 20, the position of the stop switch 4 has only a minimal influence on the measured values y that are provided by the first Hall sensor 22. However, the measured values y drop significantly upon pivoting of the lid 5, i.e., with increasing pivot angle α, and drop approximately linearly across a wide range of the pivot angle α. When the measured value measured by the first Hall sensor 22 is above a threshold value i in a range 72, the first Hall sensor 22 is detected as defective in a control unit of the working device 1 and the propelling drives 18 and the drive device 19 are switched off. When the measured value y is between the threshold value i and a second threshold value h in a range 73, the lid 5 is considered by the control unit as being in the closed position 50. The threshold value h can be selected suitably and in the embodiment is selected such that the lid 5 is considered to be closed for pivot angles α of significantly less than 50°. The threshold value h can be selected suitably in order to compensate manufacturing tolerances reliably and, at the same time, to detect a substantially open lid. The threshold value h is advantageously selected such that the operating elements 7 and 8 cannot be actuated at pivot angles α for which the lid 5 is considered to be in the closed position 50. When the measured value y of the first Hall sensor 22 is below the threshold value h in a range 74, the lid 5 is considered to be in the open position 51.

The curves 75 and 76 show measured values y of the second Hall sensor 24. The curve 75 shows the measured value y in actuated position 81 of the stop switch 4. As shown in FIG. 20, the measured value y is substantially constant and independent of the rotational position of the lid 5. The curve 76 shows the measured value y in the non-actuated position 80 of the stop switch 4. In the non-actuated position 80 of the stop switch 4 the measured values y are significantly smaller than for the actuated stop switch 4. At the same time, the measured value y is reduced upon increasing pivot angle α. For actuated position 81 of the stop switch 4, the measured value y measured by the second Hall sensor 24 is affected by the first magnet 21.

When the measured value y of the second Hall sensor 24 is above a threshold value k in a range 77, the control unit detects the stop switch 4 as being in the actuated position 81. When the measured value y is between a threshold value g and the threshold value k in a range 78, the stop switch 4 is considered to be in the non-actuated position 80. The threshold values g and h can be approximately identical. The threshold value g can also be above the threshold value h. When the measured value y of the second Hall sensor 24 is below the threshold value g in a range 79, the second Hall sensor 24 is considered to be defective.

The specification incorporates by reference the entire disclosure of European priority document 14 003 266.5 having a filing date of Sep. 20, 2014.

While specific embodiments of the invention have been shown and described in detail to illustrate the inventive principles, it will be understood that the invention may be embodied otherwise without departing from such principles.

What is claimed is:

1. A self-propelled working device comprising:
   at least one propelling drive;
   a housing;
   a pivot bearing arranged on the housing and comprising a pivot axis;
   at least one operating element arranged on the housing;
   at least one lid pivotably supported on the housing, wherein the at least one lid comprises a bearing section arranged in the pivot bearing so that the at least one lid is pivotable about the pivot axis;
   wherein the at least one lid comprises a closed position and covers in the closed position the at least one operating element;
   wherein the at least one lid comprises a first part and a second part connected to the first part, wherein the second part is connected to the first part by at least one detachable locking connection;
   wherein the bearing section is formed on the first part of the at least one lid and is positioned opposite the at least one detachable locking connection, wherein the first part and the second part pivot together about the pivot axis of the pivot bearing;
   wherein the second part of the at least one lid covers the at least one operating element;
   wherein, when a constructively predetermined pulling force is applied to the second part, the at least one detachable locking connection separates and the second part detaches from the first part.

2. The working device according to claim 1, wherein the at least one detachable locking connection comprises a locking element and a locking rim lockingly interacting with each other in a locked state of the at least one detachable locking connection, wherein the locking element is formed on an arm provided on one of the first and second parts and the locking rim is provided on the other one of the first and second parts.

3. The working device according to claim 2, wherein the locking rim delimits a locking opening into which the locking element projects at least partially in the locked state of the at least one detachable locking connection.

4. The working device according to claim 2, wherein the arm is arranged on the first part and the locking opening is arranged on the second part.

5. The working device according to claim 1, wherein the first part is supported by a spring loading the first part in the direction of an open position of the at least one lid.

6. The working device according to claim 1, wherein the at least one propelling drive is switched off when the at least one lid is not completely closed.

7. The working device according to claim 6, further comprising a drive device for at least one tool of the working device, wherein the drive device is switched off when the at least one lid is not completely closed.

8. The working device according to claim 1, further comprising a drive device for at least one tool of the working device, wherein the drive device is switched off when the at least one lid is not completely closed.

9. The working device according to claim 1, wherein the second part comprises at least one locking contour that, in the closed position of the at least one lid, locks on the housing and secures the at least one lid in the closed position.

10. The working device according to claim 1, further comprising a sensor configured to detect at least one pivot position of the first part.

11. The working device according to claim 1, wherein the pivot bearing comprises at least one receptacle arranged on the housing and comprising a circumference with an opening, wherein the bearing section is supported in the at least one receptacle and the bearing section is inserted into the receptacle through the opening.

12. The working device according to claim 11, wherein the opening is arranged on a side of the at least one receptacle that is facing away from the second part of the at least one lid.

13. The working device according to claim 12, further comprising a stop switch embodied as an actuating button arranged on the housing and at least partially covering the opening, wherein the actuating button is configured to be operated by an operator, wherein the at least one propelling drive and/or a drive device for at least one tool of the working device is switched off when the actuating button is pushed by the operator.

14. The working device according to claim 1, wherein on the first part a stop is formed that is interacting with the housing and defines a completely open position of the at least one lid.

15. The working device according to claim 1, wherein the at least one lid performs a travel stroke from a completely closed position into a completely open position across a pivot angle of approximately 70° to approximately 110°.

16. A self-propelled working device comprising:
    at least one propelling drive;
    a housing;
    a pivot bearing arranged on the housing and comprising a pivot axis;
    at least one operating element arranged on the housing;
    at least one lid pivotably supported on the housing, wherein the at least one lid comprises a bearing section arranged in the pivot bearing so that the at least one lid is pivotable about the pivot axis;
    wherein the at least one lid comprises a closed position and covers in the closed position the at least one operating element, wherein the at least one operating element is accessible in an open position of the at least one lid;
    wherein the at least one lid comprises a first part and a second part connected to the first part, wherein the second part is connected to the first part by at least one detachable connection;
    wherein, when pivoting the at least one lid from the closed position into the open position, the first part and the second part pivot together about the pivot axis of the pivot bearing;
    wherein the second part of the at least one lid covers the at least one operating element;
    wherein, when a constructively predetermined pulling force is applied to the second part, the at least one detachable connection separates and the second part detaches from the first part;
    wherein the constructively predetermined pulling force at which the second part detaches from the first part is smaller than the weight force of the working device so that the working device cannot be lifted by gripping and lifting the second part of the at least one lid.

17. A self-propelled working device comprising:
at least one propelling drive;
a housing;
a pivot bearing arranged on the housing and comprising a pivot axis;
at least one operating element arranged on the housing;
at least one lid pivotably supported on the housing, wherein the at least one lid comprises a bearing section arranged in the pivot bearing so that the at least one lid is pivotable about the pivot axis;
wherein the at least one lid comprises a closed position and covers in the closed position the at least one operating element;
wherein the at least one lid comprises a first part and a second part connected to the first part, wherein the second part is connected to the first part by at least one detachable connection;
wherein, when pivoting the at least one lid, the first part and the second part pivot together about the pivot axis of the pivot bearing;
wherein the first part is supported by a spring loading the first part in a direction of an open position of the at least one lid;
wherein the second part comprises at least one locking contour that, in the closed position of the at least one lid, locks on the housing and secures the at least one lid in the closed position;
wherein the second part of the at least one lid covers the at least one operating element;
wherein, when a constructively predetermined pulling force is applied to the second part, the at least one detachable connection separates and the second part detaches from the first part and the first part is forced by the spring in the direction of the open position of the at least one lid.

* * * * *